(12) United States Patent
Fujimoto et al.

(10) Patent No.: US 11,326,780 B2
(45) Date of Patent: May 10, 2022

(54) RESONANT SOUND ABSORBING DEVICE OF GAS TURBINE COMBUSTOR, GAS TURBINE COMBUSTOR INCLUDING THE SAME, AND GAS TURBINE

(71) Applicant: Mitsubishi Hitachi Power Systems, Ltd., Kanagawa (JP)

(72) Inventors: Kiyoshi Fujimoto, Yokohama (JP); Taiki Kinoshita, Yokohama (JP); Satoshi Mizukami, Tokyo (JP); Yoshinori Wakita, Tokyo (JP); Satoshi Takiguchi, Tokyo (JP); Wataru Kugimiya, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 258 days.

(21) Appl. No.: 16/478,200

(22) PCT Filed: Feb. 28, 2018

(86) PCT No.: PCT/JP2018/007401
§ 371 (c)(1),
(2) Date: Jul. 16, 2019

(87) PCT Pub. No.: WO2018/173659
PCT Pub. Date: Sep. 27, 2018

(65) Prior Publication Data
US 2019/0368730 A1     Dec. 5, 2019

(30) Foreign Application Priority Data
Mar. 24, 2017   (JP) .............................. JP2017-058429

(51) Int. Cl.
*F02C 7/24*      (2006.01)
*F23M 20/00*   (2014.01)
*F23R 3/00*      (2006.01)

(52) U.S. Cl.
CPC ............. *F23M 20/005* (2015.01); *F02C 7/24* (2013.01); *F23R 3/002* (2013.01); *F05D 2260/964* (2013.01); *F23R 2900/00014* (2013.01)

(58) Field of Classification Search
CPC ............. F23R 2900/00014; F02C 7/24; F02M 35/1255; F02M 35/1266; F02M 35/1261; F02K 1/827; F05D 2260/963
See application file for complete search history.

(56) References Cited

U.S. PATENT DOCUMENTS 6,464,489 B1 *  10/2002  Gutmark .................. F02B 51/06
                                                                          431/1
9,410,484 B2 *  8/2016   Schilp ...................... F01D 9/023
(Continued)

FOREIGN PATENT DOCUMENTS

CN      103620307       3/2014
CN      105431684       3/2016
(Continued)

OTHER PUBLICATIONS

International Search Report dated May 22, 2018 in International (PCT) Application No. PCT/JP2018/007401 with English translation.

(Continued)

*Primary Examiner* — Gerald L Sung
(74) *Attorney, Agent, or Firm* — Wenderoth, Lind & Ponack, L.L.P.

(57) ABSTRACT

A resonant sound absorbing device of a gas turbine combustor includes a plurality of resonance chambers independently disposed side by side in an axial direction of the gas turbine combustor so as to communicate with a gas passage of the gas turbine combustor via acoustic holes. The plurality of resonance chambers include n related resonance chambers each satisfying:

(Continued)

$$0.9 \times \sum_{i=1}^{n} \frac{F_i}{n} \leq F_i \leq 1.1 \times \sum_{i=1}^{n} \frac{F_i}{n} \quad (A)$$

where n is an integer of 2 or more, and Fi is a peak frequency corresponding to a maximum sound absorbing ratio of the ith related resonance chamber of the n related resonance chambers.

17 Claims, 5 Drawing Sheets

(56) References Cited

U.S. PATENT DOCUMENTS

| | | | |
|---|---|---|---|
| 2002/0066272 A1 | 6/2002 | Suenaga et al. | |
| 2002/0088233 A1* | 7/2002 | Ohnishi | F23R 3/002 |
| | | | 60/725 |
| 2003/0115879 A1* | 6/2003 | Nishimura | F23R 3/002 |
| | | | 60/725 |
| 2005/0223707 A1* | 10/2005 | Ikeda | F23M 20/005 |
| | | | 60/725 |
| 2011/0138812 A1 | 6/2011 | Johnson | |
| 2011/0179795 A1 | 7/2011 | Johnson et al. | |
| 2012/0181107 A1* | 7/2012 | Hwang | F02M 35/1266 |
| | | | 181/229 |
| 2013/0008167 A1 | 1/2013 | Akamatsu et al. | |
| 2013/0019602 A1* | 1/2013 | Kim | F23R 3/286 |
| | | | 60/725 |
| 2014/0345282 A1 | 11/2014 | Pfadler | |
| 2015/0020498 A1 | 1/2015 | Schilp | |
| 2015/0082794 A1 | 3/2015 | Schilp | |
| 2015/0101343 A1 | 4/2015 | Akamatsu et al. | |
| 2016/0076453 A1* | 3/2016 | Richter | B64D 33/02 |
| | | | 181/286 |
| 2016/0177832 A1 | 6/2016 | Tonon et al. | |

FOREIGN PATENT DOCUMENTS

| | | |
|---|---|---|
| CN | 105716111 | 6/2016 |
| DE | 10 2010 016 547 | 1/2011 |
| JP | 3676228 | 7/2005 |
| JP | 2009-097741 | 5/2009 |
| JP | 4274996 | 6/2009 |
| JP | 2011-17523 | 1/2011 |
| JP | 2013-19567 | 1/2013 |
| JP | 2016-128741 | 7/2016 |
| JP | 2016-525207 | 8/2016 |

OTHER PUBLICATIONS

International Preliminary Report on Patentability and Written Opinion of the International Searching Authority dated Oct. 3, 2019 in International (PCT) Application No. PCT/JP2018/007401 with English translation.
The Office Action dated Mar. 23, 2020 in counterpart Chinese Application No. 201880013147.0 with Machine translation.
Office Action dated May 27, 2020 in corresponding Korean Patent Application No. 10-2019-7024464, with English language Machine Translation.
Chinese Office Action dated Nov. 4, 2020 in CN Application No. 201880013147.0.

\* cited by examiner

RESONANT SOUND ABSORBING DEVICE OF GAS TURBINE COMBUSTOR, GAS TURBINE COMBUSTOR INCLUDING THE SAME, AND GAS TURBINE

TECHNICAL FIELD

The present disclosure relates to a resonant sound absorbing device of a gas turbine combustor, a gas turbine combustor including the same, and a gas turbine.

BACKGROUND

In a resonant sound absorbing device of a gas turbine combustor, as disclosed in Patent Document 1, a plurality of resonance chambers having different peak frequencies may be arranged side by side in an axial direction of the gas turbine combustor. The plurality of resonance chambers are typically designed as to have acoustic characteristics with very different peak frequencies (for example, the peak frequency ratio of two resonance chambers is set to about 2 to 4) in order to reduce combustion oscillation of a wide range of frequencies.

CITATION LIST

Patent Literature

Patent Document 1: JP2011-17523A

SUMMARY

Technical Problem

Meanwhile, if a high-temperature gas flows (flows back) into resonance chambers of a sound absorbing device from a gas passage, a gas turbine combustor may be damaged. Therefore, the resonance chambers each have a pressure which is normally set higher than a static pressure in the vicinity of a wall surface of the gas passage, preventing the high-temperature gas from flowing into the sound absorbing device from the gas passage.

As a result of intensive researches by the present inventors, it became clear that the static pressure in the vicinity of the wall surface of the gas passage is significantly changed depending on an axial position of the gas turbine combustor in an axial position range occupied by one typical sound absorbing device. From the above finding, it also became clear that some of the resonance chambers consume an excessive amount of purge air in order to prevent the backflow of the high-temperature gas, resulting in building a barrier to a reduction in total amount of the purge air.

In particular, in the case of supplying the purge air to the resonance chambers from a shared air supply system with combustion air combusted by the gas turbine combustor, if the purge air is excessively supplied to the resonance chambers, the amount of the combustion air combusted by the gas turbine combustor is decreased accordingly, resulting in a problem that the temperature of a combustion gas and the discharge amount of NOx (nitrogen oxide) are increased.

At least one embodiment of the present invention was made in view of the above conventional problem. An object of at least one embodiment of the present invention is to provide a resonant sound absorbing device of a gas turbine combustor, a gas turbine combustor including the same, and a gas turbine, which can reduce the total amount of the purge air.

Solution to Problem (1) A resonant sound absorbing device of a gas turbine combustor according to at least one embodiment of the present invention includes a plurality of resonance chambers independently disposed side by side in an axial direction of the gas turbine combustor so as to communicate with a gas passage of the gas turbine combustor via acoustic holes. The plurality of resonance chambers include n related resonance chambers each satisfying:

$$0.9 \times \sum_{i=1}^{n} \frac{F_i}{n} \leq F_i \leq 1.1 \times \sum_{i=1}^{n} \frac{F_i}{n} \qquad (A)$$

where n is an integer of 2 or more, and $F_i$ is a peak frequency corresponding to a maximum sound absorbing ratio of an ith related resonance chamber of the n related resonance chambers.

With the above configuration (1), since the plurality of related resonance chambers having similar peak frequencies $$\left(0.9 \times \sum_{i=1}^{n} \frac{F_i}{n} \leq F_i \leq 1.1 \times \sum_{i=1}^{n} \frac{F_i}{n}\right)$$

are independently disposed side by side in the axial direction, it is possible to appropriately set the pressure of each of the related resonance chambers in accordance with a static-pressure distribution in the vicinity of a wall surface of the gas passage at an axial position of each of the related resonance chambers. Therefore, it is possible to reduce the total amount of purge air by distributing the purge air within a range capable of suppressing the backflow of a high-temperature gas to each of the related resonance chambers in consideration of the static-pressure distribution in the vicinity of the wall surface of the gas passage.

(2) In some embodiments, in the resonant sound absorbing device of the gas turbine combustor according to the above (1), the resonant sound absorbing device of the gas turbine combustor includes a plurality of resonance chambers independently disposed side by side in an axial direction of the gas turbine combustor so as to communicate with a gas passage of the gas turbine combustor via acoustic holes.

The plurality of resonance chambers include n related resonance chambers each satisfying:

$$0.9 \times \sum_{i=1}^{n} \frac{R_i}{n} \leq R_i \leq 1.1 \times \sum_{i=1}^{n} \frac{R_i}{n} \qquad (B)$$

where $R_i$ is an opening ratio by the acoustic holes of a wall portion separating the gas passage from an ith related resonance chamber of the n related resonance chambers.

With the above configuration (2), since the plurality of related resonance chambers having similar opening ratios $$\left(0.9 \times \sum_{i=1}^{n} \frac{F_i}{n} \leq F_i \leq 1.1 \times \sum_{i=1}^{n} \frac{F_i}{n}\right)$$

are independently disposed side by side in the axial direction, it is possible to appropriately set the pressures of the respective related resonance chambers in accordance with the static-pressure distribution in the vicinity of the wall surface of the gas flow passage at the axial positions of the respective related resonance chambers. Therefore, it is possible to reduce the total amount of purge air by distributing the purge air within a range capable of suppressing the backflow of a high-temperature gas to each of the related resonance chambers in consideration of the static-pressure distribution in the vicinity of the wall surface of the gas passage.

(3) In some embodiments, in the resonant sound absorbing device of the gas turbine combustor according to the above (1) or (2), the n related resonance chambers have substantially the same peak frequency corresponding to the maximum sound absorbing ratio.

With the above configuration (3), since the plurality of related resonance chambers having the similar peak frequencies are independently disposed side by side in the axial direction, it is possible to appropriately set the pressure of each of the related resonance chambers in accordance with the static-pressure distribution in the vicinity of the wall surface of the gas passage at the axial position of each of the related resonance chambers. Therefore, it is possible to reduce the total amount of purge air by distributing the purge air within a range capable of suppressing the backflow of a high-temperature gas to each of the related resonance chambers in consideration of the static-pressure distribution in the vicinity of the wall surface of the gas passage.

(4) In some embodiments, in the resonant sound absorbing device of the gas turbine combustor according to any one of the above (1) to (3), the n related resonance chambers have substantially the same opening ratio by the acoustic holes of a wall portion separating the gas passage from each of the related resonance chambers.

With the above configuration (4), since the plurality of related resonance chambers having the similar opening ratios are independently disposed side by side in the axial direction, it is possible to appropriately set the pressure of each of the related resonance chambers in accordance with the static-pressure distribution in the vicinity of the wall surface of the gas passage at the axial position of each of the related resonance chambers. Therefore, it is possible to reduce the total amount of purge air by distributing the purge air within a range capable of suppressing the backflow of a high-temperature gas to each of the related resonance chambers in consideration of the static-pressure distribution in the vicinity of the wall surface of the gas passage.

(5) In some embodiments, in the resonant sound absorbing device of the gas turbine combustor according to any one of the above (1) to (4), the resonant sound absorbing device of the gas turbine combustor further includes a housing defining an inner space communicating with the gas passage via the acoustic holes and at least one partition wall portion partitioning the inner space of the housing into the n related resonance chambers in the axial direction of the gas turbine combustor.

With the above configuration (5), it is possible to achieve an appropriate distribution amount of the purge air to each of the related resonance chambers while suppressing the backflow of the high-temperature gas to each of the related resonance chambers by appropriately deciding a position of the partition wall portion in accordance with the static-pressure distribution in the vicinity of the wall surface of the gas passage. Thus, it is possible to reduce the total amount of the purge air.

(6) In some embodiments, in the resonant sound absorbing device of the gas turbine combustor according to any one of the above (1) to (5), the n related resonance chambers include a first resonance chamber having a first inner pressure during an operation of the gas turbine combustor, and a second resonance chamber disposed downstream of the first resonance chamber and having a second inner pressure lower than the first inner pressure during the operation of the gas turbine combustor.

As a result of the inventors' intensive researches concerning the static-pressure distribution in the vicinity of the wall surface of the gas passage, it is found that a static pressure in the vicinity of the wall surface of the gas passage tends to decrease toward downstream of the gas passage.

The above configuration (6) is based on the above findings of the present inventors. It is possible to achieve the appropriate distribution amount of the purge air to the first resonance chamber and the second resonance chamber while suppressing the backflows of the high-temperature gas to the first resonance chamber and the second resonance chamber by setting the second inner pressure of the second resonance chamber positioned downstream lower than the first inner pressure of the first resonance chamber. Thus, it is possible to reduce the total amount of the purge air.

(7) In some embodiment, in the resonant sound absorbing device of the gas turbine combustor according to any one of the above (1) to (6), the n related resonance chambers include a first resonance chamber which includes a first gas introduction unit internally introducing a gas, and a second resonance chamber which includes a second gas introduction unit internally introducing a gas and is disposed downstream of the first resonance chamber, and the first gas introduction unit is greater in at least one of a number density or an introduction area per unit area than the second gas introduction unit.

With the above configuration (7), it is possible to achieve the appropriate distribution amount of the purge air to each of the resonance chambers by setting at least one of the number density or the introduction area of the first gas introduction unit of the first resonance chamber greater than the number density or the introduction area of the second gas introduction unit of the second resonance chamber, thereby making the inner pressure of the second resonance chamber lower than the inner pressure of the first resonance chamber.

(8) In some embodiment, in the resonant sound absorbing device of the gas turbine combustor according to the above (7), a housing forming each of the related resonance chambers includes a purge air hole serving as the first gas introduction unit or the second gas introduction unit, and the purge air hole of the first resonance chamber is greater in at least one of a number density or an opening area per unit area than the purge air hole of the second resonance chamber.

With the above configuration (8), it is possible to achieve the appropriate distribution amount of the purge air to each of the resonance chambers by setting at least one of the number density or the opening area of the purge air hole of the first resonance chamber greater than the number density or the opening area of the purge air hole of the second resonance chamber, thereby making the inner pressure of the second resonance chamber lower than the inner pressure of the first resonance chamber.

(9) In some embodiments, in the resonant sound absorbing device of the gas turbine combustor according to the above (7) or (8), with each of the related resonance chambers, cooling air flow passages disposed in a combustion cylinder of the gas turbine combustor as the first gas introduction unit or the second gas introduction unit are brought into communication, and at least one of the number or a flow-passage cross sectional area of the cooling air flow passages communicating with the first resonance chamber is larger than the number or a flow-passage cross sectional area of the cooling air flow passages communicating with the second resonance chamber.

With the above configuration (9), it is possible to achieve the appropriate distribution amount of the purge air to the first resonance chamber and the second resonance chamber by setting the number or the flow-passage cross sectional area of the cooling air flow passages communicating with the first resonance chamber larger than the number or the flow-passage cross sectional area of the cooling air flow passages of the second resonance chamber, thereby making the inner pressure of the second resonance chamber lower than the inner pressure of the first resonance chamber.

(10) In some embodiments, in the resonant sound absorbing device of the gas turbine combustor according to any one of the above (1) to (6), a housing forming each of the related resonance chambers is configured to satisfy:

$$0.9 \times \sum_{i=1}^{n} \frac{H_i}{n} \leq H_i \leq 1.1 \times \sum_{i=1}^{n} \frac{H_i}{n} \quad (C)$$

where Hi is a height of a housing in the ith related resonance chamber of the n related resonance chambers.

With the above configuration (10), it is possible to set acoustic characteristics of the plurality of related resonance chambers independently disposed side by side in the axial direction to be similar to each other. Thus, it is possible to implement an acoustic damping function suitable for an axial position range occupied by the plurality of related resonance chambers while allowing an appropriate distribution of the purge air by independently setting the inner pressures of the respective related resonance chambers in accordance with the static-pressure distribution in the vicinity of the wall surface of the gas passage.

(11) In some embodiments, in the resonant sound absorbing device of the gas turbine combustor according to any one of the above (1) to (10), housings forming each of the related resonance chambers have substantially the same height.

(12) In some embodiments, in the resonant sound absorbing device of the gas turbine combustor according to any one of the above (1) to (11), an axial width of at least a most upstream resonance chamber positioned most upstream of the n related resonance chambers is larger than an axial width of a subsequent resonance chamber adjacent to a downstream of the most upstream resonance chamber of the n related resonance chambers.

A typical sound absorbing device is disposed at an axial position corresponding to flame of the gas turbine combustor with the object of effectively suppressing combustion oscillation.

As a result of intensive researches by the present inventors, it became clear that the static-pressure distribution in the vicinity of the wall surface of the gas passage tends to have a peak in the axial position range occupied by the most upstream resonance chamber. A possible reason for the static pressure in the vicinity of the wall surface of the gas passage to increase downward to an axial position of the most upstream resonance chamber is that a non-combusted gas is attracted toward the wall surface of the gas passage by a centrifugal force due to a swirl component of a non-combusted gas flow in the gas passage. On the other hand, a possible reason for the static pressure in the vicinity of the wall surface of the gas passage to decrease downward from the axial position of the most upstream resonance chamber is based on an expansion action of the combustion gas with progression to a combustion reaction.

The above configuration (12) is based on the above tendency of the static-pressure distribution in the vicinity of the wall surface of the gas passage founded by the present inventors. It is possible to appropriately distribute the purge air within the range capable of suppressing the backflow of the high-temperature gas to each of the resonance chambers by setting the axial width of the most upstream resonance chamber larger than the axial width of the subsequent resonance chamber.

(13) A gas turbine combustor according to at least one embodiment of the present invention includes a combustion cylinder and the resonant sound absorbing device according to any one of the above (1) to (12) attached to the combustion cylinder.

With the gas turbine combustor according to the above (13), since the gas turbine combustor includes the resonant sound absorbing device according to any one of the above (1) to (12), it is possible to reduce the total amount of the purge air.

(14) A gas turbine according to at least one embodiment of the present invention includes a compressor, the combustor according to the above (13) configured to combust fuel by compressed air generated by the compressor, and a turbine configured to be driven by a combustion gas generated by the combustor.

With the gas turbine according to the above (14), since the gas turbine includes the combustor according to the above (13), it is possible to reduce the total amount of the purge air.

(15) A method of operating a gas turbine according to at least one embodiment of the present invention includes a step of supplying purge air to a plurality of resonance chambers independently disposed side by side in an axial direction of a gas turbine combustor so as to communicate with a gas passage of the gas turbine combustor via acoustic holes. The plurality of resonance chambers include n related resonance chambers each satisfying:

$$0.9 \times \sum_{i=1}^{n} \frac{F_i}{n} \leq F_i \leq 1.1 \times \sum_{i=1}^{n} \frac{F_i}{n} \quad (A)$$

where n is an integer of 2 or more, and Fi is a peak frequency corresponding to a maximum sound absorbing ratio of an ith related resonance chamber of the n related resonance chambers. In the step of supplying the purge air, a supply amount of the purge air is set such that the n related resonance chambers have different inner pressures.

In the resonant sound absorbing device of the gas turbine combustor, a plurality of resonance chambers having different peak frequencies may be arranged side by side in the axial direction of the gas turbine combustor. The plurality of resonance chambers are typically designed as to have acoustic characteristics with very different peak frequencies (for example, the peak frequency ratio of two resonance chambers is set to about 2 to 4) in order to reduce combustion oscillation of a wide range of frequencies.

As a result of intensive researches by the present inventors, it became clear that the static pressure in the vicinity of the wall surface of the gas passage is significantly changed depending on an axial position of the gas turbine combustor in an axial position range occupied by one typical sound absorbing device. From the above finding, it also became clear that some of the resonance chambers consume an excessive amount of purge air in order to prevent the backflow of the high-temperature gas, resulting in building a barrier to a reduction in total amount of the purge air.

In this regard, with the method of operating the gas turbine according to the above (15), in a state in which the plurality of related resonance chambers having the similar peak frequencies $$\left(0.9 \times \sum_{i=1}^{n} \frac{F_i}{n} \leq F_i \leq 1.1 \times \sum_{i=1}^{n} \frac{F_i}{n}\right)$$

are independently disposed side by side in the axial direction, the supply amount of the purse air to the plurality of related resonance chambers is set such that the respective resonance chambers have different inner pressures in accordance with the static-pressure distribution in the vicinity of the wall surface of the gas passage at the axial positions of the respective related resonance chambers. Therefore, it is possible to reduce the total amount of purge air by distributing the purge air within a range capable of suppressing the backflow of a high-temperature gas to each of the related resonance chambers in consideration of the static-pressure distribution in the vicinity of the wall surface of the gas passage.

(16) In some embodiments, in the method of operating the gas turbine according to the above (15), in the step of supplying the purge air, the supply amount of the purge air to each of the related resonance chambers is set such that a second inner pressure of a second resonance chamber positioned downstream of a first resonance chamber of the n related resonance chambers is lower than a first inner pressure of the first resonance chamber of the n related resonance chambers.

As a result of the inventors' intensive researches concerning the static-pressure distribution in the vicinity of the wall surface of the gas passage, it is found that a static pressure in the vicinity of the wall surface of the gas passage tends to decrease toward downstream of the gas passage.

The method of operating the gas turbine according to the above (17) is based on the above findings of the present inventors. It is possible to achieve the appropriate distribution amount of the purge air to each of the resonance chambers while suppressing the backflow of the high-temperature gas to each of the resonance chambers by setting the second inner pressure of the second resonance chamber positioned downstream lower than the first inner pressure of the first resonance chamber. Thus, it is possible to reduce the total amount of the purge air.

(17) A method of designing a resonant sound absorbing device of a gas turbine combustor according to at least one embodiment of the present invention is a method of designing a resonant sound absorbing device of a gas turbine combustor, the method including a step of adding a partition wall for dividing an inner space of a housing of an existing resonant sound absorbing device into a plurality of resonance chambers in an axial direction of the gas turbine combustor.

As the result of intensive researches by the present inventors, it became clear that the static pressure in the vicinity of the wall surface of the gas passage is significantly changed depending on the axial position of the gas turbine combustor in the axial position range occupied by one typical sound absorbing device. From the above finding, it became also clear that some of the resonance chambers consume an excessive amount of purge air in order to prevent the backflow of the high-temperature gas, resulting in building a barrier to a reduction in total amount of the purge air.

In this regard, according to the method of designing the resonant sound absorbing device of the gas turbine combustor according to the above (17), it is possible to appropriately set the pressure of each of the resonance chambers in accordance with the static-pressure distribution in the vicinity of the wall surface of the gas passage at the axial position of each of the resonance chambers by adding the partition wall for dividing the inner space of the housing of the existing resonant sound absorbing device into the plurality of resonance chambers in the axial direction of the gas turbine combustor. Therefore, it is possible to design the resonant sound absorbing device of the gas turbine combustor which can distribute the purge air within the range capable of suppressing the backflow of the high-temperature gas to each of the resonance chambers in consideration of the static-pressure distribution in the vicinity of the wall surface of the gas passage and reduce the total amount of the purge air.

(18) A resonant sound absorbing device of a gas turbine combustor according to at least one embodiment of the present invention includes a housing which forms an inner space communicating with a gas passage of the gas turbine combustor via an acoustic hole and a partition wall for dividing the inner space of the housing into a plurality of resonance chambers in an axial direction of the gas turbine combustor.

As the result of intensive researches by the present inventors, it became clear that the static pressure in the vicinity of the wall surface of the gas passage is significantly changed depending on the axial position of the gas turbine combustor in the axial position range occupied by one typical sound absorbing device. From the above finding, it became also clear that some of the resonance chambers consume an excessive amount of purge air in order to prevent the backflow of the high-temperature gas, resulting in building a barrier to a reduction in total amount of the purge air.

In this regard, with the resonant sound absorbing device of the gas turbine combustor according to the above (18), it is possible to appropriately set the pressure of each of the resonance chambers in accordance with the static-pressure distribution in the vicinity of the wall surface of the gas passage at the axial position of each of the resonance chambers by providing the partition wall for dividing the inner space of the housing of the existing resonant sound absorbing device into the plurality of resonance chambers in the axial direction of the gas turbine combustor. Therefore, it is possible to design the resonant sound absorbing device of the gas turbine combustor which can distribute the purge air within the range capable of suppressing the backflow of the high-temperature gas to each of the resonance chambers in consideration of the static-pressure distribution in the vicinity of the wall surface of the gas passage and reduce the total amount of the purge air.

Advantageous Effects

According to at least one embodiment of the present invention, a resonant sound absorbing device of a gas turbine combustor, a gas turbine combustor including the same, and a gas turbine, which can reduce the total amount of purge air are provided.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

Figure 1:
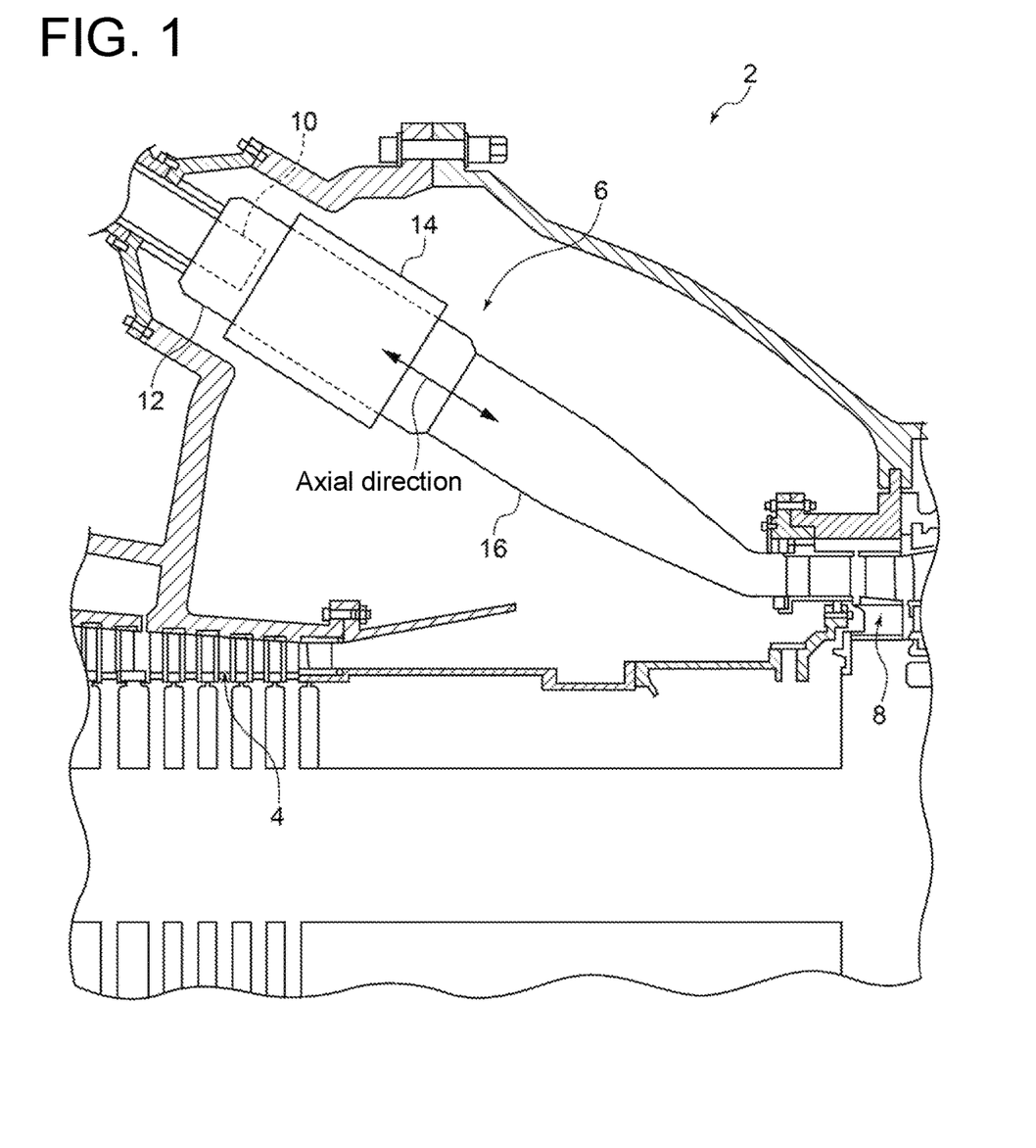
FIG. 1 is a schematic cross-sectional view of a gas turbine 2 according to an embodiment, taken along its rotational axis.

FIG. 1 is a schematic cross-sectional view of a gas turbine 2 according to an embodiment, taken along its rotational axis.

As shown in FIG. 1, the gas turbine 2 includes a compressor 4 compressing outside air and generating compressed air, a gas turbine combustor 6 configured to combust fuel from a fuel supply source (not shown) using the compressed air generated by the compressor 4, and a turbine 8 configured to be driven by a combustion gas generated by the gas turbine combustor 6.

The gas turbine combustor 6 includes a nozzle 10 injecting fuel, a combustion cylinder 12 in which the fuel injected from the nozzle 10 is combusted, a resonant sound absorbing device 14 attached to the combustion cylinder 12, and a transition piece 16 guiding a combustion gas generated in the combustion cylinder 12 to the side of the turbine 8.

Hereinafter, the axial direction of the gas turbine combustor 6 (the axial direction of the combustion cylinder 12) is referred to as merely an "axial direction", and the circumferential direction of the gas turbine combustor 6 (the circumferential direction of the combustion cylinder 12) is referred to as merely a "circumferential direction", and the radial direction of the gas turbine combustor 6 (the radial direction of the combustion cylinder 12) is referred to as merely a "radial direction". In addition, the upstream of a combustion gas flow in the axial direction is referred to as merely "upstream", and the downstream of the combustion gas flow in the axial direction is referred to as merely "downstream".

Figure 2A:
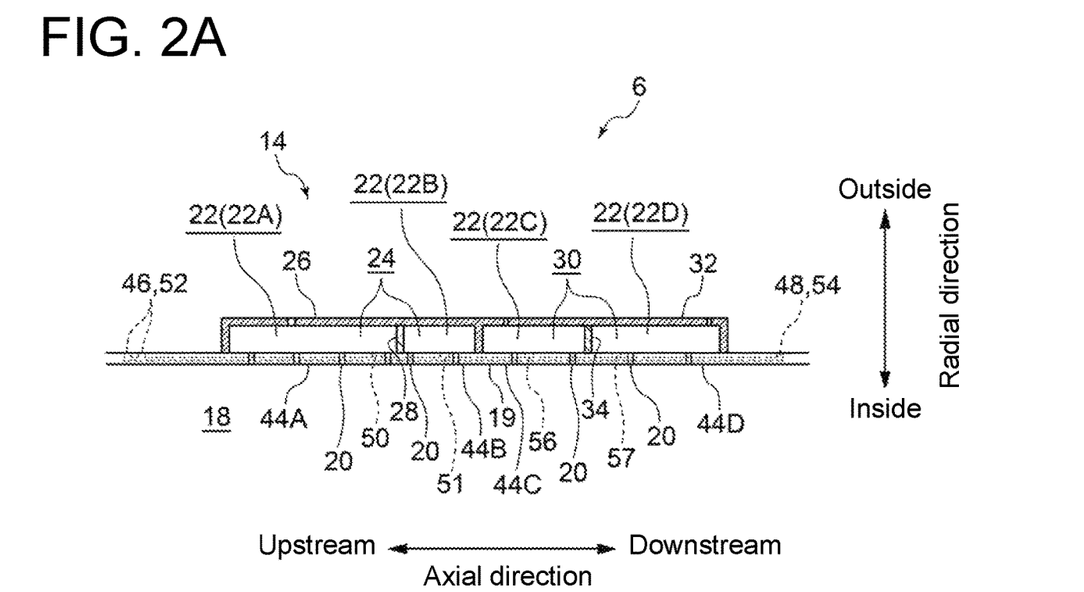
FIG. 2A is a schematic cross-sectional view of a partial configuration of a gas turbine combustor 6 according to an embodiment, taken along its axial direction.
Figure 2B:
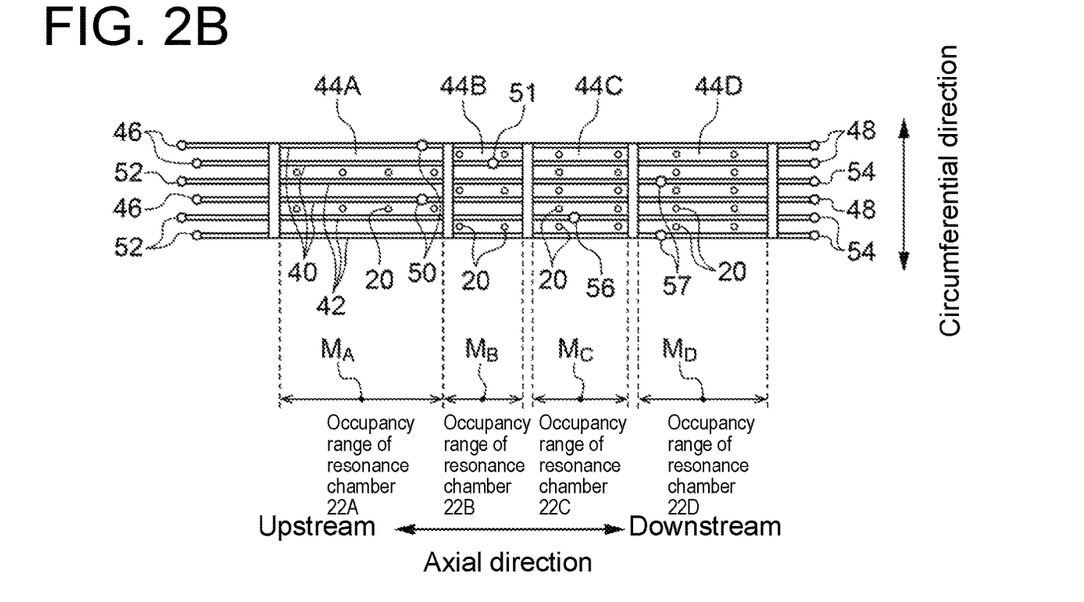
FIG. 2B is an exploded view of a partial configuration of a combustion cylinder 12.

FIG. 2A is a schematic cross-sectional view of a partial configuration of the gas turbine combustor 6 according to an embodiment, taken along its axial direction. FIG. 2B is an exploded view of a partial configuration of the combustion cylinder 12, taken along its circumferential direction.

As shown in FIG. 2A, the resonant sound absorbing device 14 includes a plurality of resonance chambers 22 (22A to 22D) independently disposed side by side in the axial direction so as to communicate with a gas passage 18 of the gas turbine combustor 6 via acoustic holes 20. The plurality of resonance chambers 22A, 22B, 22C, and 22D are arranged adjacent to each other sequentially from upstream along the axial direction.

Figure 3:
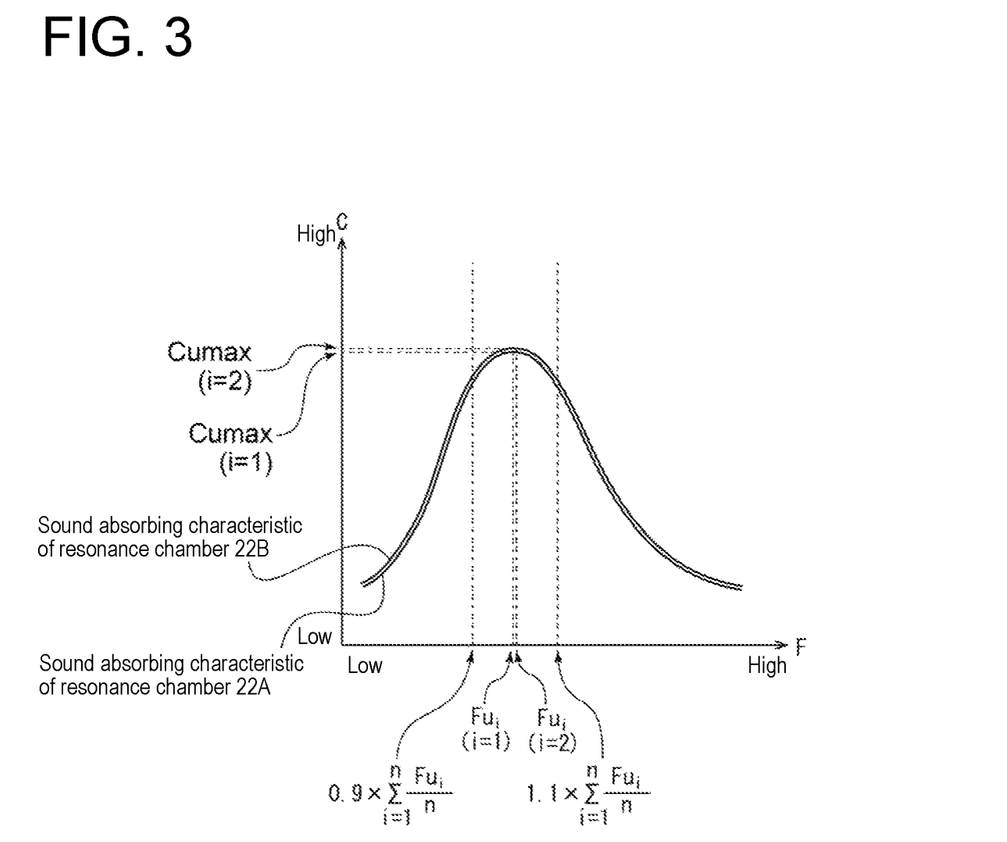
FIG. 3 is a graph of a sound absorbing characteristic indicating a relationship between a frequency F and a sound absorbing ratio C in each of a plurality of resonance chambers 22 (22A and 22B).

FIG. 3 is a graph of a sound absorbing characteristic indicating a relationship between a frequency F and a sound absorbing ratio C in each of the plurality of resonance chambers 22 (22A to 22D).

In an embodiment, for example, as shown in FIGS. 2A and 3, the plurality of resonance chambers 22 include the n (two in the depicted embodiment) upstream related resonance chambers 22A and 22B each satisfying:

$$0.9 \times \sum_{i=1}^{n} \frac{Fu_i}{n} \leq Fu_i \leq 1.1 \times \sum_{i=1}^{n} \frac{Fu_i}{n} \quad \text{(A1)}$$

where n is an integer of 2 or more, and $Fu_i$ is a peak frequency corresponding to a maximum sound absorbing ratio Cumax of the ith upstream related resonance chamber 22 of the n upstream related resonance chambers 22A and 22B.

Putting the above expression (A1) another way, the peak frequency $Fu_i$ corresponding to the maximum sound absorbing ratio Cumax in each of the upstream related resonance chambers 22A and 22B satisfies $0.9 \times Fu_{ave} \leq Fu_i \leq 1.1 \times Fu_{ave}$ where $Fu_{ave}$ is an average value of the peak frequencies $Fu_i$ of the n upstream related resonance chambers 22A and 22B. That is, the plurality of resonance chambers 22 include the plurality of upstream related resonance chambers 22A and 22B having the similar peak frequencies $Fu_i$.

With the above configuration, since the upstream related resonance chambers 22A and 22B having the similar peak frequencies $Fu_i$ are independently disposed side by side in the axial direction, it is possible to appropriately set the pressure of each of the upstream related resonance chambers 22A and 22B in accordance with a static-pressure distribution in the vicinity of a wall surface 19 of the gas passage 18 at an axial position of each of the upstream related resonance chambers 22A and 22B. Therefore, it is possible to reduce the total amount of purge air (gas) to the plurality of resonance chambers 22 by distributing the purge air to the upstream related resonance chambers 22A and 22B within a range capable of suppressing the backflows of a high-temperature gas from the gas passage 18 to the upstream related resonance chambers 22A and 22B in consideration of the static-pressure distribution in the vicinity of the wall surface 19 of the gas passage 18. Moreover, in the case of supplying the purge air to each of the resonance chambers 22 from a shared air supply system with combustion air combusted by the gas turbine combustor 6, it is possible to suppress a decrease in amount of the combustion air combusted by the gas turbine combustor 6. Thus, it is possible to suppress an increase in discharge amount of NOx (nitrogen oxide).

In an embodiment, for example, as shown in FIG. 2A, the resonant sound absorbing device 14 includes a housing 26 which defines an inner space 24 communicating with the gas passage 18 via the acoustic holes 20, and at least one partition wall portion 28 which partitions the inner space 24 of the housing 26 into the n upstream related resonance chambers 22A and 22B in the axial direction.

With the above configuration, it is possible to achieve an appropriate distribution amount of the purge air to each of the upstream related resonance chambers 22A and 22B while suppressing the backflow of the high-temperature gas to each of the upstream related resonance chambers 22A and 22B by appropriately deciding a position of the partition wall portion 28 in accordance with the static-pressure distribution in the vicinity of the wall surface 19 of the gas passage 18. Thus, it is possible to reduce the total amount of the purge air.

In an embodiment, for example, as shown in FIG. 2A, the plurality of resonance chambers 22 include the n (two in the depicted embodiment) downstream related resonance chambers 22C and 22D each satisfying:

$$0.9 \times \sum_{i=1}^{n} \frac{Fd_i}{n} \leq Fd_i \leq 1.1 \times \sum_{i=1}^{n} \frac{Fd_i}{n} \quad (A2)$$

where n is the integer of 2 or more, and $Fd_i$ is a peak frequency corresponding to a maximum sound absorbing ratio $C_{dmax}$ of the ith upstream related resonance chamber of the n downstream related resonance chambers 22C and 22D.

Putting the above expression (A2) another way, the peak frequency $Fd_i$ corresponding to the maximum sound absorbing ratio $C_{dmax}$ in each of the downstream related resonance chambers 22C and 22D satisfies $0.9 \times Fd_{ave} \leq Fd_i \leq 1.1 \times Fd_{ave}$ where $Fd_{ave}$ is an average value of the peak frequencies $Fd_i$ of the n downstream related resonance chambers 22C and 22D. That is, the plurality of resonance chambers 22 include the plurality of downstream related resonance chambers 22C and 22D having the similar peak frequencies $Fd_i$.

With the above configuration, since the downstream related resonance chambers 22C and 22D having the similar peak frequencies $Fd_i$ are independently disposed side by side in the axial direction, it is possible to appropriately set the pressure of each of the upstream related resonance chambers 22C and 22D in accordance with the static-pressure distribution in the vicinity of the wall surface 19 of the gas passage 18 at an axial position of each of the downstream related resonance chambers 22C and 22D. Therefore, it is possible to reduce the total amount of the purge air by distributing the purge air to each of the downstream related resonance chambers 22C and 22D within a range capable of suppressing the backflow of the high-temperature gas from the gas passage 18 to each of the downstream related resonance chambers 22C and 22D in consideration of the static-pressure distribution in the vicinity of the wall surface 19 of the gas passage 18.

Thus, it is possible to reduce the total amount of the purge air by appropriately distributing the purge air to each of the resonance chambers 22 (22A to 22D) within the range capable of suppressing the backflow of the high-temperature gas from the gas passage 18 to each of the resonance chambers 22 (22A to 22D) in consideration of the static-pressure distribution in the vicinity of the wall surface 19 of the gas passage 18.

In an embodiment, for example, as shown in FIG. 2A, the resonant sound absorbing device 14 includes a housing 32 which defines an inner space 30 communicating with the gas passage 18 via the acoustic holes 20, and at least one partition wall portion 34 which partitions the inner space 30 of the housing 32 into the n downstream related resonance chambers 22C and 22D in the axial direction.

With the above configuration, it is possible to achieve an appropriate distribution amount of the purge air to each of the downstream related resonance chambers 22C and 22D while suppressing the backflow of the high-temperature gas to each of the downstream related resonance chambers 22C and 22D by appropriately deciding an axial position of the partition wall portion 34 in accordance with the static-pressure distribution in the vicinity of the wall surface 19 of the gas passage 18. Thus, it is possible to reduce the total amount of the purge air.

In an embodiment, for example, in FIGS. 2A and 2B, the acoustic hole 20 in each of the upstream related resonance chambers 22A and 22B is configured to satisfy:

$$0.9 \times \sum_{i=1}^{n} \frac{Ru_i}{n} \leq Ru_i \leq 1.1 \times \sum_{i=1}^{n} \frac{Ru_i}{n} \quad (B1)$$

where $Ru_i$ is an opening ratio of a wall portion 44A or a wall portion 44B which separates the gas passage 18 from the ith upstream related resonance chamber 22 of the n upstream related resonance chambers 22A and 22B. The opening ratio means the ratio of an opening area to the area of the target wall portion.

Figure 4:
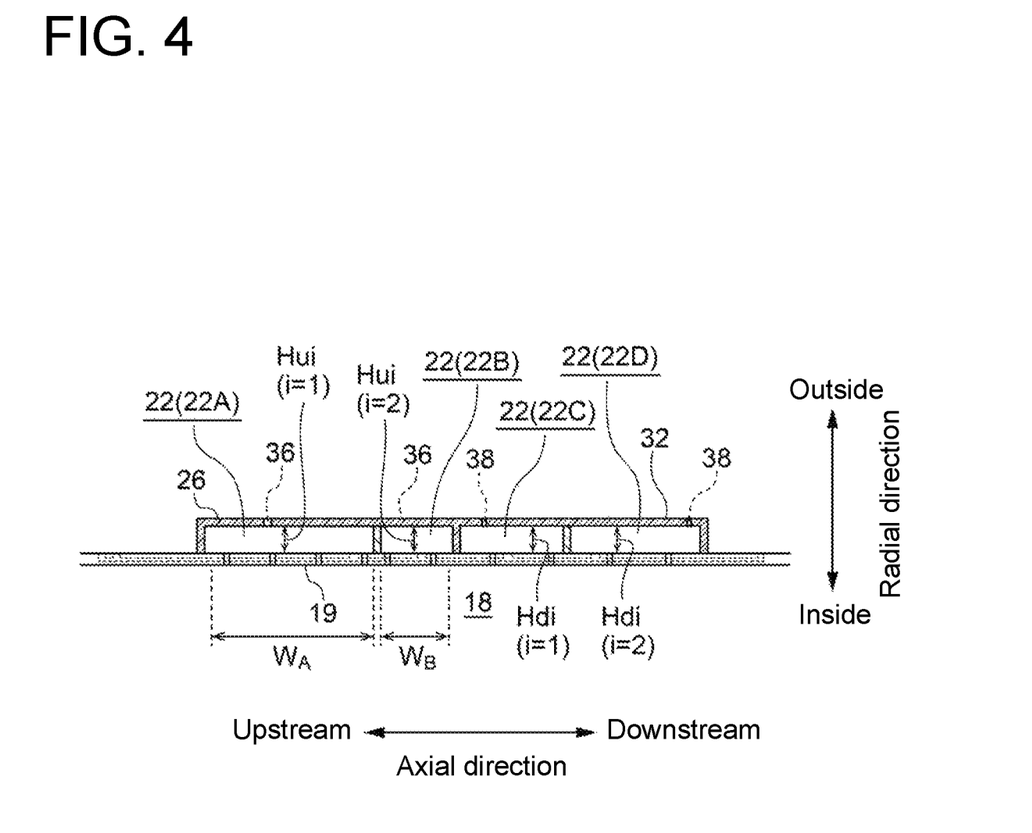
FIG. 4 is a schematic cross-sectional view of the partial configuration of the gas turbine combustor 6 according to an embodiment, taken along its axial direction.

In addition, for example, in FIG. 4, the housing 26 forming each of the upstream related resonance chambers 22A and 22B is configured to satisfy:

$$0.9 \times \sum_{i=1}^{n} \frac{Hu_i}{n} \leq Hu_i \leq 1.1 \times \sum_{i=1}^{n} \frac{Hu_i}{n} \quad (C1)$$

where $Hu_i$ is a radial height of the housing 26 in the ith upstream related resonance chamber 22 of the n upstream related resonance chambers 22A and 22B.

With the above configuration, it is possible to set acoustic characteristics of the plurality of related resonance chambers 22A and 22B independently disposed side by side in the axial direction to be similar to each other. Thus, it is possible to implement an acoustic damping function suitable for an axial position range occupied by the plurality of related resonance chambers 22A and 22B while allowing an appropriate distribution of the purge air by independently setting the inner pressures of the respective related resonance chambers 22A and 22B in accordance with the static-pressure distribution in the vicinity of the wall surface 19 of the gas passage 18.

In an embodiment, for example, in FIGS. 2A and 2B, the acoustic hole 20 in each of the downstream related resonance chambers 22C and 22D is configured to satisfy:

$$0.9 \times \sum_{i=1}^{n} \frac{Rd_i}{n} \leq Rd_i \leq 1.1 \times \sum_{i=1}^{n} \frac{Rd_i}{n} \quad \text{(B2)}$$

where $Rd_i$ is an opening ratio of a wall portion 44C or a wall portion 44D which separates the gas passage 18 from the ith downstream related resonance chamber 22 of the n downstream related resonance chambers 22C and 22D.

In addition, for example, in FIG. 4, the housing 32 forming each of the downstream related resonance chambers 22C and 22D is configured to satisfy:

$$0.9 \times \sum_{i=1}^{n} \frac{Hd_i}{n} \leq Hd_i \leq 1.1 \times \sum_{i=1}^{n} \frac{Hd_i}{n} \quad \text{(C2)}$$

where $Hd_i$ is a radial height of the housing 32 in the ith downstream related resonance chamber of the n downstream related resonance chambers 22C and 22D.

With the above configuration, it is possible to set acoustic characteristics of the plurality of related resonance chambers 22C and 22D independently disposed side by side in the axial direction to be similar to each other. Thus, it is possible to implement an acoustic damping function suitable for an axial position range occupied by the plurality of related resonance chambers 22C and 22D while allowing the appropriate distribution of the purge air by independently setting the inner pressures of the respective related resonance chambers 22C and 22D in accordance with the static-pressure distribution in the vicinity of the wall surface 19 of the gas passage 18.

In an embodiment, for example, in FIG. 4, $P_A > P_B > P_C > P_D$ is satisfied where $P_A$ is an inner pressure of the upstream related resonance chamber 22A during an operation of the gas turbine combustor 6, $P_B$ is an inner pressure of the upstream related resonance chamber 22B during the operation of the gas turbine combustor 6, $P_C$ is an inner pressure of the downstream related resonance chamber 22C during the operation of the gas turbine combustor 6, and $P_D$ is an inner pressure of the downstream related resonance chamber 22D during the operation of the gas turbine combustor 6.

Figure 5A:
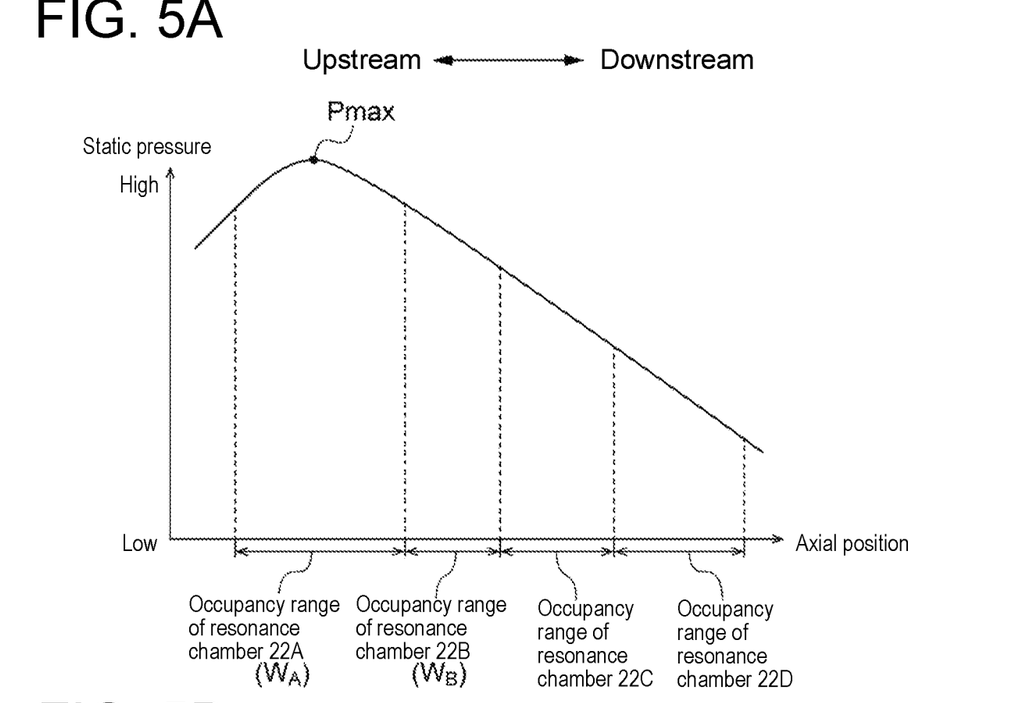
FIG. 5A is a graph of a static-pressure distribution with respect to an axial position in the vicinity of a wall surface 19 (an inner peripheral surface of the combustion cylinder 12) of a gas passage 18.

FIG. 5A is a graph of the static-pressure distribution with respect to the axial position in the vicinity of the wall surface 19 (an inner peripheral surface of the combustion cylinder 12) of the gas passage 18.

As a result of the inventors' intensive researches concerning the static-pressure distribution in the vicinity of the wall surface 19 (the inner peripheral surface of the combustion cylinder 12) of the gas passage 18, it is found that, as shown in FIG. 5A, a static pressure in the vicinity of the wall surface 19 of the gas passage 18 tends to decrease toward downstream of the gas passage 18.

The above configuration is based on the above findings of the present inventors. Satisfying $P_A > P_B > P_C > P_D$, it is possible to achieve the appropriate distribution amount of the purge air to each of the resonance chambers 22 (22A to 22D) while suppressing the backflow of the high-temperature gas to each of the resonance chambers 22 (22A to 22D). Thus, it is possible to reduce the total amount of the purge air.

In an embodiment, as shown in FIG. 4, an axial width $W_A$ of at least the most upstream resonance chamber 22A positioned most upstream of the n upstream related resonance chambers 22A and 22B is larger than an axial width $W_B$ of the subsequent resonance chamber 22B adjacent to the downstream of the most upstream resonance chamber 22A of the upstream related resonance chambers 22A and 22B.

Figure 5B:
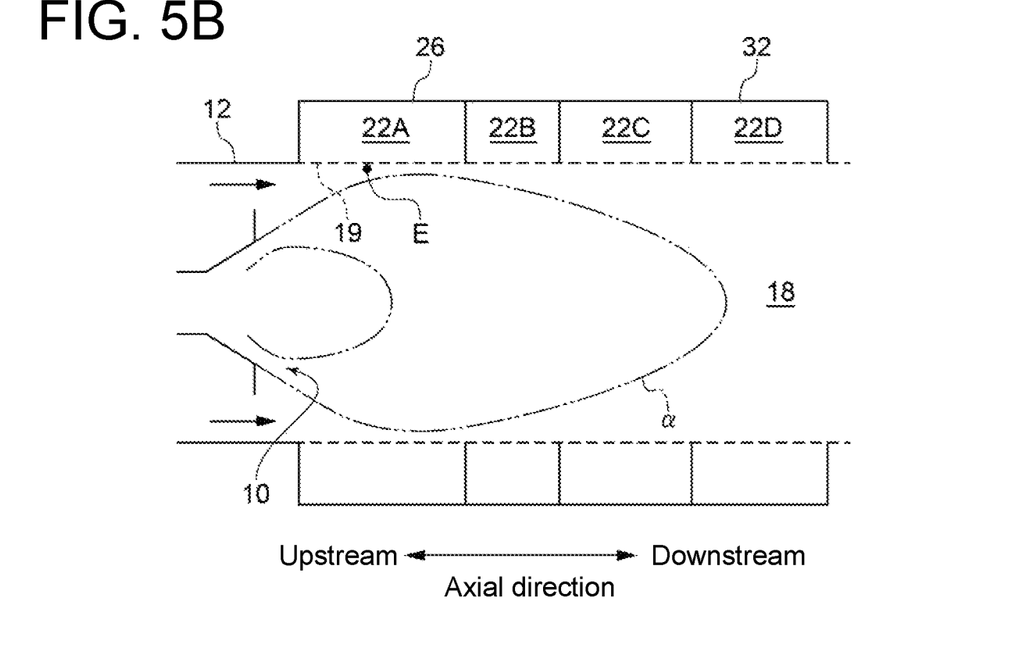
FIG. 5B is a schematic cross-sectional view of a positional relationship between a resonant sound absorbing device 14 and flame α from a burner 10.

As shown in FIG. 5B, the resonant sound absorbing device 14 is disposed at an axial position corresponding to flame α of the gas turbine combustor 6 with the object of effectively suppressing combustion oscillation. As a result of intensive researches by the present inventors, it became clear that, as shown in FIGS. 5A and 5B, the static-pressure distribution in the vicinity of the wall surface 19 of the gas passage 18 tends to have a peak pressure Pmax in the vicinity of a position E in the axial position range occupied by the most upstream resonance chamber 22A. A possible reason for the static pressure in the vicinity of the wall surface 19 of the gas passage 18 to increase downward to the axial position E of the most upstream resonance chamber 22A is that a non-combusted gas is attracted toward the wall surface 19 of the gas passage 18 by a centrifugal force due to a swirl component of a non-combusted gas flow in the gas passage 18. On the other hand, a possible reason for the static pressure in the vicinity of the wall surface 19 of the gas passage 18 to decrease downward from the axial position of the most upstream resonance chamber 22A is based on an expansion action of the combustion gas with progression to a combustion reaction.

The above configuration is based on the above tendency of the static-pressure distribution in the vicinity of the wall surface 19 of the gas passage 18 founded by the present inventors. It is possible to appropriately distribute the purge air within the range capable of suppressing the backflow of the high-temperature gas to each of the resonance chambers 22 by setting the axial width $W_A$ of the most upstream resonance chamber 22A larger than the axial width of the subsequent resonance chamber 22B.

In an embodiment, as shown in FIG. 4, the housing 26 forming each of the upstream related resonance chambers 22A and 22B includes purge air holes 36 (first gas introduction units) for introducing the purge air to the upstream related resonance chambers 22A and 22B. The purge air hole 36 of the upstream related resonance chamber 22A is greater in at least one of a number density or an opening area (introduction area) per unit area than the purge air hole 36 of the upstream related resonance chamber 22B.

With the above configuration, it is possible to achieve the appropriate distribution amount of the purge air to each of the resonance chambers 22 by setting at least one of the number density or the opening area of the purge air hole 36 of the upstream related resonance chamber 22A greater than the number density or the opening area of the purge air hole 36 of the upstream related resonance chamber 22B, thereby making the inner pressure of the upstream related resonance chamber 22B lower than the inner pressure of the upstream related resonance chamber 22A.

In some embodiments, as shown in FIG. 4, the housing 32 forming each of the downstream related resonance chambers 22C and 22D includes purge air holes 38 (second gas introduction units) for introducing the purge air to the downstream related resonance chambers 22C and 22D. The purge air hole 38 of the downstream related resonance chamber 22C is greater in at least one of the number density or the opening area (introduction area) per unit area than the purge air hole 38 of the downstream related resonance chamber 22D.

With the above configuration, it is possible to achieve the appropriate distribution amount of the purge air to each of the resonance chambers 22 by setting at least one of the number density or the opening area of the purge air hole 38 of the downstream related resonance chamber 22C greater than the number density or the opening area of the purge air hole 38 of the downstream related resonance chamber 22D, thereby making the inner pressure of the downstream related resonance chamber 22D lower than the inner pressure of the downstream related resonance chamber 22C.

In an embodiment, as shown in FIGS. 2A and 2B, with each of the upstream related resonance chambers 22A and 22B, cooling air flow passages 40 disposed in the combustion cylinder 12 of the gas turbine combustor 6 are brought into communication. At least one of the number or the flow-passage cross sectional area of the cooling air flow passages 40 communicating with the upstream related resonance chamber 22A is larger than the number or the flow-passage cross sectional area of the cooling air flow passages 40 communicating with the upstream related resonance chamber 22B.

In the depicted illustrative embodiment, the cooling air flow passages 40 each extend along the axial direction inside the combustion cylinder 12 and into the cooling air flow passages 40, cooling air flows from inlet holes 46 disposed axial upstream of the upstream related resonance chamber 22A and inlet holes 48 disposed axial downstream of the downstream related resonance chamber 22D.

The cooling air flow passages 40 communicating with the upstream related resonance chamber 22A include outlet holes 50 connected to the upstream related resonance chamber 22A downstream of an axial center position $M_A$ in the upstream related resonance chamber 22A. The cooling air flow passages 40 communicating with the upstream related resonance chamber 22A are configured to supply the cooling air as the purge air from the outlet holes 50 to the upstream related resonance chamber 22A.

The cooling air flow passages 40 communicating with the upstream related resonance chamber 22B include an outlet hole 51 connected to the upstream related resonance chamber 22B downstream of an axial center position $M_B$ in the upstream related resonance chamber 22B. The cooling air flow passages 40 communicating with the upstream related resonance chamber 22B are configured to supply the cooling air as the purge air from the outlet hole 51 to the upstream related resonance chamber 22B.

With the above configuration, it is possible to achieve the appropriate distribution amount of the purge air to the upstream related resonance chamber 22A and the upstream related resonance chamber 22B by setting the number or the flow-passage cross sectional area of the cooling air flow passages 40 communicating with the upstream related resonance chamber 22A larger than the number or the flow-passage cross sectional area of the cooling air flow passages 40 communicating with the upstream related resonance chamber 22B, thereby making the inner pressure of the upstream related resonance chamber 22B lower than the inner pressure of the upstream related resonance chamber 22A.

In addition, for example, if the flow-passage cross sectional area of the cooling air flow passages 40 communicating with the upstream related resonance chamber 22A changes between the upstream and the downstream of the outlet holes 50 or if the flow-passage cross sectional area of the cooling air flow passages 40 communicating with the downstream related resonance chamber 22B changes between the upstream and the downstream of the outlet hole 51, the flow-passage cross sectional area of flow passage portions of the cooling air flow passages 40 communicating with the downstream related resonance chamber 22A upstream of the outlet holes 50 may be larger than the flow-passage cross sectional area of flow passage portions of the cooling air flow passages 40 communicating with the downstream related resonance chamber 22B upstream of the outlet hole 51.

In an embodiment, as shown in FIGS. 2A and 2B, with each of the downstream related resonance chambers 22C and 22D, cooling air flow passages 42 disposed in the combustion cylinder 12 of the gas turbine combustor 6 are brought into communication. At least one of the number or the flow-passage cross sectional area of the cooling air flow passages 42 communicating with the downstream related resonance chamber 22C is larger than the number or the flow-passage cross sectional area of the cooling air flow passages 42 communicating with the downstream related resonance chamber 22D.

In the depicted illustrative embodiment, the cooling air flow passages 42 each extend along the axial direction inside the combustion cylinder 12 and into the cooling air flow passages 42, the cooling air flows from an inlet hole 52 disposed axial upstream of the downstream related resonance chamber 22A and an inlet hole 54 disposed axial downstream of the downstream related resonance chamber 22D.

The cooling air flow passages 42 communicating with the downstream related resonance chamber 22C include an outlet hole 56 connected to the downstream related resonance chamber 22C upstream of an axial center position $M_C$ in the downstream related resonance chamber 22C. The cooling air flow passages 42 communicating with the downstream related resonance chamber 22C are configured to supply the cooling air as the purge air from the outlet hole 56 to the upstream related resonance chamber 22C.

The cooling air flow passages 42 communicating with the downstream related resonance chamber 22D include outlet holes 57 connected to the downstream related resonance chamber 22D upstream of an axial center position $M_D$ in the downstream related resonance chamber 22D. The cooling air flow passages 42 communicating with the downstream related resonance chamber 22D are configured to supply the cooling air as the purge air from the outlet holes 57 to the upstream related resonance chamber 22D.

With the above configuration, it is possible to achieve the appropriate distribution amount of the purge air to the downstream related resonance chamber 22C and the downstream related resonance chamber 22D by setting the number or the flow-passage cross sectional area of the cooling air flow passages 42 communicating with the downstream related resonance chamber 22C larger than the number or the flow-passage cross sectional area of the cooling air flow passages 42 communicating with the downstream related resonance chamber 22D, thereby making the inner pressure of the downstream related resonance chamber 22D lower than the inner pressure of the downstream related resonance chamber 22C.

If the flow-passage cross sectional area of the cooling air flow passages 42 communicating with the downstream related resonance chamber 22C is larger than the flow-passage cross sectional area of the cooling air flow passages 42 communicating with the downstream related resonance chamber 22D, the radial height of the cooling air flow passages 42 communicating with the downstream related resonance chamber 22C may be greater than the radial height of the cooling air flow passages 42 communicating with the downstream related resonance chamber 22D, or the circumferential width of the cooling air flow passages 42 communicating with the downstream related resonance chamber 22C may be larger than the circumferential width of the cooling air flow passages 42 communicating with the downstream related resonance chamber 22D. If the radial height of the cooling air flow passages 42 communicating with the downstream related resonance chamber 22C is greater than the radial height of the cooling air flow passages 42 communicating with the downstream related resonance chamber 22D, the flow-passage cross sectional area of the cooling air flow passages 42 is increased easily while avoiding the acoustic holes 20.

In addition, for example, if the flow-passage cross sectional area of the cooling air flow passages 42 communicating with the downstream related resonance chamber 22C changes between the upstream and the downstream of the outlet hole 56 or if the flow-passage cross sectional area of the cooling air flow passages 42 communicating with the downstream related resonance chamber 22D changes between the upstream and the downstream of the outlet holes 57, the flow-passage cross sectional area of flow passage portions of the cooling air flow passages 42 communicating with the downstream related resonance chamber 22C upstream of the outlet hole 56 may be larger than the flow-passage cross sectional area of flow passage portions of the cooling air flow passages 42 communicating with the downstream related resonance chamber 22D upstream of the outlet holes 57.

Embodiments of the present invention were described in detail above, but the present invention is not limited thereto, and various amendments and modifications may be implemented.

For example, in order to achieve the appropriate distribution amount of the purge air in the above-described gas turbine combustor 6, at least one of (a) the ratio of an acoustic resistance of the upstream related resonance chamber 22A to an acoustic resistance of the upstream related resonance chamber 22B, (b) the ratio of the peak frequency of the upstream related resonance chamber 22A to the peak frequency of the upstream related resonance chamber 22B, (c) the ratio of the height of the housing 26 in the upstream related resonance chamber 22A to the height of the housing 26 in the upstream related resonance chamber 22B, or (d) the ratio of the opening ratio of the wall portion 44A separating the upstream related resonance chamber 22A and the gas passage 18 to the opening ratio of the wall portion 44B separating the upstream related resonance chamber 22B and the gas passage 18 may be higher than at least one of (e) the ratio of the inner pressure of the upstream related resonance chamber 22A to the inner pressure of the upstream related resonance chamber 22B during the operation of the gas turbine or (f) the ratio of a total area of intake ports of the purge air to the upstream related resonance chamber 22A to a total area of intake ports of the purge air to the upstream related resonance chamber 22B.

In addition, in order to achieve the appropriate distribution amount of the purge air in the above-described gas turbine combustor 6, at least one of (a) the ratio of an acoustic resistance of the downstream related resonance chamber 22C to an acoustic resistance of the downstream related resonance chamber 22D, (b) the ratio of the peak frequency of the downstream related resonance chamber 22C to the peak frequency of the downstream related resonance chamber 22D, (c) the ratio of the height of the housing 32 in the downstream related resonance chamber 22C to the height of the housing 32 in the downstream related resonance chamber 22D, or (d) the ratio of the opening ratio of the wall portion 44C separating the downstream related resonance chamber 22C and the gas passage 18 to the opening ratio of the wall portion 44D separating the downstream related resonance chamber 22D and the gas passage 18 may be higher than at least one of (e) the ratio of the inner pressure of the downstream related resonance chamber 22C to the inner pressure of the downstream related resonance chamber 22D during the operation of the gas turbine or (f) the ratio of a total area of intake ports of the purge air to the downstream related resonance chamber 22C to a total area of intake ports of the purge air to the downstream related resonance chamber 22D.

In addition, in the above-described embodiment, the resonant sound absorbing device 14 including the four resonance chambers 22 (22A to 22D) is described as an example. However, the number of resonance chambers 22 is not limited to four but can be two or more.

That is, the resonant sound absorbing device can include the plurality of resonance chambers independently disposed side by side in the axial direction of the gas turbine combustor so as to communicate with the gas passage of the gas turbine combustor via the acoustic holes. The plurality of resonance chambers can include n related resonance chambers each satisfying:

$$0.9 \times \sum_{i=1}^{n} \frac{F_i}{n} \leq F_i \leq 1.1 \times \sum_{i=1}^{n} \frac{F_i}{n} \quad (A)$$

where n is the integer of 2 or more, and $F_i$ is the peak frequency corresponding to the maximum sound absorbing ratio of the ith related resonance chamber of the n related resonance chambers.

Thus, it is possible to appropriately set the pressure of each of the related resonance chambers in accordance with the static-pressure distribution in the vicinity of the wall surface of the gas passage at the axial position of each of the related resonance chambers by independently disposing two or more related resonance chambers having the similar peak frequencies $$\left(0.9 \times \sum_{i=1}^{n} \frac{F_i}{n} \leq F_i \leq 1.1 \times \sum_{i=1}^{n} \frac{F_i}{n}\right)$$

side by side in the axial direction. Therefore, it is possible to reduce the total amount of purge air by distributing the purge air within a range capable of suppressing the backflow of a high-temperature gas to each of the related resonance chambers in consideration of the static-pressure distribution in the vicinity of the wall surface of the gas passage.

In addition, regarding the plurality of related resonance chambers 22 in the above-described embodiment, when $Fd_{ave}$ is the average value of the peak frequencies $Fd_i$, $Fd_{max}$ is a maximum value of the peak frequencies $Fd_i$, $Fd_{min}$ is a minimum value of the peak frequencies $Fd_i$, $Fu_{ave}$ is the average value of the peak frequencies $Fu_i$, $Fu_{max}$ is a maximum value of the frequencies $Fu_i$, and $Fu_{min}$ is a minimum value of the peak frequencies $Fu_i$, the plurality of related resonance chambers 22 may be configured such that $(Fd_{ave}-Fu_{ave})/Fu_{ave}$ is sufficiently larger than $(Fu_{max}-Fu_{min})/Fu_{min}$ or $(Fd_{max}-Fd_{min})/Fd_{min}$.

That is, the plurality of related resonance chambers 22 may be configured to satisfy at least one of the following expressions (D) or (E).

$$(Fd_{ave}-Fu_{ave})/Fu_{ave} \geq 10 \times (Fu_{max}-Fu_{min})/Fu_{min} \quad (D)$$

$$(Fd_{ave}-Fu_{ave})/Fu_{ave} \geq 10 \times (Fd_{max}-Fd_{min})/Fd_{min} \quad (E)$$

Thus, it is possible to appropriately set the pressure of each of the related resonance chambers 22 in accordance with the static-pressure distribution in the vicinity of the wall surface 19 of the gas passage 18 at the axial position of each of the related resonance chambers 22 by independently disposing the two or more related resonance chambers 22 having the similar peak frequencies side by side in the axial direction. Therefore, it is possible to reduce the total amount of the purge air by distributing the purge air within the range capable of suppressing the backflow of the high-temperature gas to each of the related resonance chambers 22 in consideration of the static-pressure distribution in the vicinity of the wall surface 19 of the gas passage 18.

In addition, regarding the plurality of related resonance chambers 22 in the above-described embodiment, when $Rd_{ave}$ is an average value of the opening ratios $Rd_i$, $Rd_{max}$ is a maximum value of the opening ratios $Rd_i$, $Rd_{min}$ is a minimum value of the opening ratios $Rd_i$, $Ru_{ave}$ is an average value of the opening ratios $Ru_i$, $Ru_{max}$ is a maximum value of the opening ratios $Ru_i$, and $Ru_{min}$ is a minimum value of the opening ratios $Ru_i$, the plurality of related resonance chambers 22 may be configured such that $(Rd_{ave}-Ru_{ave})/Ru_{ave}$ is sufficiently larger than $(Ru_{max}-Ru_{min})/Ru_{min}$ or $(Rd_{max}-Rd_{min})/Rd_{min}$.

That is, the plurality of related resonance chambers 22 may be configured to satisfy at least one of the following expressions (F) or (G).

$$(Rd_{ave}-Ru_{ave})/Ru_{ave} \geq 10 \times (Ru_{max}-Ru_{min})/Ru_{min} \quad (F)$$

$$(Rd_{ave}-Ru_{ave})/Ru_{ave} \geq 10 \times (Rd_{max}-Rd_{min})/Rd_{min} \quad (G)$$

Thus, it is possible to appropriately set the pressure of each of the related resonance chambers 22 in accordance with the static-pressure distribution in the vicinity of the wall surface 19 of the gas passage 18 at the axial position of each of the related resonance chambers 22 by independently disposing the two or more related resonance chambers 22 having the similar peak frequencies side by side in the axial direction. Therefore, it is possible to reduce the total amount of the purge air by distributing the purge air within the range capable of suppressing the backflow of the high-temperature gas to each of the related resonance chambers 22 in consideration of the static-pressure distribution in the vicinity of the wall surface 19 of the gas passage 18.

In addition, regarding the plurality of related resonance chambers 22 in the above-described embodiment, when $Hd_{ave}$ is an average value of the heights $Hd_i$, $Hd_{max}$ is a maximum value of the heights $Hd_i$, $Hd_{min}$ is a minimum value of the heights $Hd_i$, $Hu_{ave}$ is an average value of the heights $Hu_i$, $Hu_{max}$ is a maximum value of the heights $Hu_i$, and $Hu_{min}$ is a minimum value of the heights $Hu_i$, the plurality of related resonance chambers 22 may be configured such that $(Hd_{ave}-Hu_{ave})/Hu_{ave}$ is sufficiently larger than $(Hu_{max}-Hu_{min})/Hu_{min}$ or $(Hd_{max}-Hd_{min})/Hd_{min}$.

That is, the plurality of related resonance chambers 22 may be configured to satisfy at least one of the following expressions (H) or (I).

$$(Hd_{ave}-Hu_{ave})/Hu_{ave} \geq 10 \times (Hu_{max}-Hu_{min})/Hu_{min} \quad (H)$$

$$(Hd_{ave}-Hu_{ave})/Hu_{ave} \geq 10 \times (Hd_{max}-Hd_{min})/Hd_{min} \quad (I)$$

Thus, it is possible to appropriately set the pressure of each of the related resonance chambers 22 in accordance with the static-pressure distribution in the vicinity of the wall surface 19 of the gas passage 18 at the axial position of each of the related resonance chambers 22 by independently disposing the two or more related resonance chambers 22 having the similar peak frequencies side by side in the axial direction. Therefore, it is possible to reduce the total amount of the purge air by distributing the purge air within the range capable of suppressing the backflow of the high-temperature gas to each of the related resonance chambers 22 in consideration of the static-pressure distribution in the vicinity of the wall surface 19 of the gas passage 18.

REFERENCE SIGNS LIST

2 Gas turbine
4 Compressor
6 Gas turbine combustor
8 Turbine
10 Nozzle
12 Combustion cylinder
14 Resonant sound absorbing device
16 Transition piece
18 Gas passage
19 Wall surface
20 Acoustic hole
22 Resonance chamber
   22A Upstream related resonance chamber (most upstream resonance chamber)
   22B Upstream related resonance chamber (subsequent resonance chamber)
   22C Downstream related resonance chamber
   22D Downstream related resonance chamber
24, 30 Inner space
26, 32 Housing
28, 34 Partition wall portion
36, 38 Purge air hole
40, 42 Cooling air flow passage
44A, 44B, 44C, 44D Wall portion
46, 48, 52, 54 Inlet hole
50, 51, 56, 57 Outlet hole

The invention claimed is:

1. A resonant sound absorbing device of a gas turbine combustor, comprising:
a plurality of resonance chambers independently disposed side by side in an axial direction of the gas turbine combustor so as to communicate with a gas passage of the gas turbine combustor via acoustic holes,
wherein the plurality of resonance chambers include n related resonance chambers each satisfying:

$$0.9 \times \sum_{i=1}^{n} \frac{F_i}{n} \leq F_i \leq 1.1 \times \sum_{i=1}^{n} \frac{F_i}{n} \quad (A)$$

where n is an integer of 2 or more, and $F_i$ is a peak frequency corresponding to a maximum sound absorbing ratio of an ith related resonance chamber of the n related resonance chambers,
wherein the n related resonance chambers include:
a first resonance chamber which includes a first gas introduction unit introducing a gas into the first resonance chamber; and
a second resonance chamber which includes a second gas introduction unit introducing a gas into the second resonance chamber and is disposed downstream of the first resonance chamber, and wherein the first gas introduction unit is greater in at least one of a number density or an introduction area per unit area than the second gas introduction unit.

2. The resonant sound absorbing device of the gas turbine combustor according to claim 1,
wherein the n related resonance chambers have substantially the same peak frequency corresponding to the maximum sound absorbing ratio.

3. The resonant sound absorbing device of the gas turbine combustor according to claim 1,
wherein the acoustic holes are formed in a wall which separates the gas passage from the plurality of resonance chambers, each of the plurality of resonance chambers being separated from the gas passage by a respective wall portion of the wall, and
wherein for each of the n related resonance chambers, a ratio of an opening area of the acoustic holes in the respective wall portion to the area of the respective wall portion is substantially the same.

4. The resonant sound absorbing device of the gas turbine combustor according to claim 1, further comprising:
a housing defining an inner space communicating with the gas passage via the acoustic holes; and
at least one partition wall portion partitioning the inner space of the housing into the n related resonance chambers in the axial direction of the gas turbine combustor.

5. The resonant sound absorbing device of the gas turbine combustor according to claim 1,
wherein a housing forming each of the n related resonance chambers includes a first purge air hole serving as the first gas introduction unit of the first resonance chamber and a second purge air hole serving as the second gas introduction unit of the second resonance chamber, and
wherein the first purge air hole of the first resonance chamber is greater in at least one of a number density or an opening area per unit area than the second purge air hole of the second resonance chamber.

6. The resonant sound absorbing device of the gas turbine combustor according to claim 1,
wherein cooling air flow passages disposed in a combustion cylinder of the gas turbine combustor are brought into communication with each of the n related resonance chambers, and the cooling air flow passages brought into communication with the first and second resonance chambers serve as the first gas introduction unit and the second gas introduction unit, respectively, and
wherein at least one of the number of the cooling air flow passages brought into communication with the first resonance chamber, or a flow-passage cross sectional area of the cooling air flow passages brought into communication with the first resonance chamber, is larger than that of the cooling air flow passages brought into communication with the second resonance chamber.

7. The resonant sound absorbing device of the gas turbine combustor according to claim 1,
wherein a housing forming each of the n related resonance chambers is configured to satisfy:

$$0.9 \times \sum_{i=1}^{n} \frac{H_i}{n} \leq H_i \leq 1.1 \times \sum_{i=1}^{n} \frac{H_i}{n} \qquad (C)$$

where $H_i$ is the height of the housing in the ith related resonance chamber of the n related resonance chambers.

8. The resonant sound absorbing device of the gas turbine combustor according to claim 1,
wherein a housing forming each of the n related resonance chambers has substantially the same height.

9. A gas turbine combustor comprising:
a combustion cylinder; and
the resonant sound absorbing device according to claim 1 attached to the combustion cylinder.

10. A gas turbine comprising:
a compressor;
the combustor according to claim 9 configured to combust fuel by compressed air generated by the compressor; and
a turbine configured to be driven by a combustion gas generated by the combustor.

11. A resonant sound absorbing device of a gas turbine combustor, comprising:
a plurality of resonance chambers independently disposed side by side in an axial direction of the gas turbine combustor so as to communicate with a gas passage of the gas turbine combustor via acoustic holes,
wherein the plurality of resonance chambers include n related resonance chambers each satisfying:

$$0.9 \times \sum_{i=1}^{n} \frac{F_i}{n} \leq F_i \leq 1.1 \times \sum_{i=1}^{n} \frac{F_i}{n} \qquad (A)$$

where n is an integer of 2 or more, and $F_i$ is a peak frequency corresponding to a maximum sound absorbing ratio of an ith related resonance chamber of the n related resonance chambers,
wherein the n related resonance chambers include:
a first resonance chamber having a first inner pressure during an operation of the gas turbine combustor; and
a second resonance chamber disposed downstream of the first resonance chamber and having a second inner pressure lower than the first inner pressure during the operation of the gas turbine combustor.

12. A resonant sound absorbing device of a gas turbine combustor, comprising: a plurality of resonance chambers independently disposed side by side in an axial direction of the gas turbine combustor so as to communicate with a gas passage of the gas turbine combustor via acoustic holes, wherein the plurality of resonance chambers include n related resonance chambers each satisfying: wherein n is an integer of 2 or more, and Fi is a peak frequency corresponding to a maximum sound absorbing ratio of an ith related resonance chamber of the related resonance chambers, wherein an axial width of at least a most upstream resonance chamber positioned most upstream of the n related resonance chambers is larger than an axial width of a subsequent resonance chamber adjacent to the most upstream resonance chamber of the n related resonance chambers, wherein the most upstream resonance chamber and the subsequent resonance chamber are a part of the n related resonance chambers, 5 wherein one of the n related resonance chambers includes a first gas introduction unit introducing a gas thereinto, wherein another of the n related resonance chambers includes a second gas introduction unit introducing a gas thereinto, the another of the n related resonance chambers being disposed downstream of the one of the n related resonance chambers, and wherein the first gas introduction unit is greater in at least one of a number density or an introduction area per unit area than the second gas introduction unit.

13. A method of operating a gas turbine, comprising:
a step of supplying purge air to a plurality of resonance chambers independently disposed side by side in an axial direction of a gas turbine combustor so as to communicate with a gas passage of the gas turbine combustor via acoustic holes,
wherein the plurality of resonance chambers include n related resonance chambers each satisfying:

$$0.9 \times \sum_{i=1}^{n} \frac{F_i}{n} \leq F_i \leq 1.1 \times \sum_{i=1}^{n} \frac{F_i}{n} \quad \text{(A)}$$

where n is an integer of 2 or more, and $F_i$ is a peak frequency corresponding to a maximum sound absorbing ratio of an ith related resonance chamber of the n related resonance chambers, and
wherein, in the step of supplying the purge air, a supply amount of the purge air is set such that the n related resonance chambers have different inner pressures.

14. The method of operating the gas turbine according to claim 13,
wherein, in the step of supplying the purge air, the supply amount of the purge air to each of the related resonance chambers is set such that a second inner pressure of a second resonance chamber positioned downstream of a first resonance chamber of the n related resonance chambers is lower than a first inner pressure of the first resonance chamber of the n related resonance chambers.

15. The method of operating the gas turbine according to claim 13,
wherein the n related resonance chambers include:
a first resonance chamber which includes a first gas introduction unit introducing the purge air into the first resonance chamber; and
a second resonance chamber which includes a second gas introduction unit introducing the purge air into the second resonance chamber and is disposed downstream of the first resonance chamber, and
wherein the first gas introduction unit is greater in at least one of a number density or an introduction area per unit area than the second gas introduction unit.

16. The method of operating the gas turbine according to claim 13,
wherein the n related resonance chambers include:
a first resonance chamber which includes a first gas introduction unit introducing the purge air into the first resonance chamber; and
a second resonance chamber which includes a second gas introduction unit introducing the purge air into the second resonance chamber and is disposed downstream of the first resonance chamber,
wherein cooling air flow passages disposed in a combustion cylinder of the gas turbine combustor are brought into communication with each of the n related resonance chambers, and the cooling air flow passages brought into communication with the first and second resonance chambers serve as the first gas introduction unit and the second gas introduction unit, respectively, and
wherein, in the step of supplying the purge air, the first gas introduction unit and the second gas introduction unit introduce the purge air so that the inner pressure of the second resonance chamber is lower than the inner pressure of the first resonance chamber.

17. A resonant sound absorbing device of a gas turbine combustor comprising:
a plurality of resonance chambers independently disposed side by side in an axial direction of the gas turbine combustor so as to communicate with a gas passage of the gas turbine combustor via acoustic holes,
wherein the plurality of resonance chambers include n related resonance chambers each satisfying:

$$0.9 \times \sum_{i=1}^{n} \frac{F_i}{n} \leq F_i \leq 1.1 \times \sum_{i=1}^{n} \frac{F_i}{n} \quad \text{(A)}$$

where n is an integer of 2 or more, and $F_i$ is a peak frequency corresponding to a maximum sound absorbing ratio of an ith related resonance chamber of the n related resonance chambers,
wherein the n related resonance chambers include:
a first resonance chamber which includes a first gas introduction unit introducing a gas into the first resonance chamber; and
a second resonance chamber which includes a second gas introduction unit internally introducing a gas into the second resonance chamber and is disposed downstream of the first resonance chamber,
wherein cooling air flow passages disposed in a combustion cylinder of the gas turbine combustor are brought into communication with each of the n related resonance chambers, and the cooling air flow passages brought into communication with the first and second resonance chambers serve as the first gas introduction unit and the second gas introduction unit, respectively, and
wherein the first gas introduction unit and the second gas introduction unit introduce the gas so that the inner pressure of the second resonance chamber is lower than the inner pressure of the first resonance chamber.

* * * * *